United States Patent [19]

Fredericks et al.

[11] 4,382,567
[45] May 10, 1983

[54] SAFETY FLOTATION DEVICE FOR AIRCRAFT

[76] Inventors: Victor L. Fredericks; Muriel E. Bray, both of Box 206, Old Chester Rd., Goshen, N.Y. 10924

[21] Appl. No.: 227,380

[22] Filed: Jan. 22, 1981

[51] Int. Cl.³ .............................................. B64C 25/56
[52] U.S. Cl. ................................................... 244/107
[58] Field of Search ............... 244/100 R, 100 A, 101, 244/105, 106, 107, 102 R

[56] References Cited

U.S. PATENT DOCUMENTS

| | | | |
|---|---|---|---|
| 1,010,644 | 12/1911 | Lake | 244/107 |
| 1,733,973 | 10/1929 | Monteith et al. | 244/107 |
| 1,748,492 | 2/1930 | Mikula | 244/107 |
| 1,787,976 | 1/1931 | Evensen | 244/107 |
| 1,818,597 | 8/1931 | Adams et al. | 244/107 |
| 2,711,868 | 6/1955 | Parker et al. | 244/107 |
| 3,790,110 | 2/1974 | Earl | 244/102 R |
| 3,865,332 | 2/1975 | Coles | 244/102 R |

FOREIGN PATENT DOCUMENTS

| | | | |
|---|---|---|---|
| 702874 | 2/1941 | Fed. Rep. of Germany | 244/100 A |
| 436530 | 3/1912 | France | 244/107 |
| 941135 | 1/1949 | France | 244/105 |

*Primary Examiner*—Galen L. Barefoot

[57] ABSTRACT

An aircraft flotation unit used severally on both low wing and high wing and multi-engine aircraft, comprised of a fiberglass or equal enclosure attached to the underside of small and medium size aircraft and built into the underside of commercial size aircraft, said device varying in size and number dependent on the relative size of the aircraft and the unit or units containing rubberized fabric inflatable by gaseous liquid which is released by means of a throttle type control cable and/or automatic device from a container, which when activated thereby allows the fiberglass enclosure to open and the rectangular flat inflatable floats to extend and support all types of aircraft upon the surface of the water. The floats have two additional valves for oral and mechanical inflation. When the floats are extended to their most extended position, they are all on the same plane.

5 Claims, 6 Drawing Figures

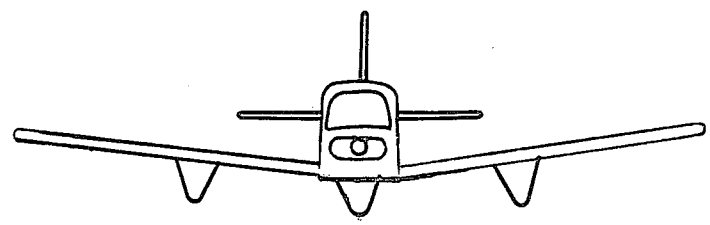
FIG.-1
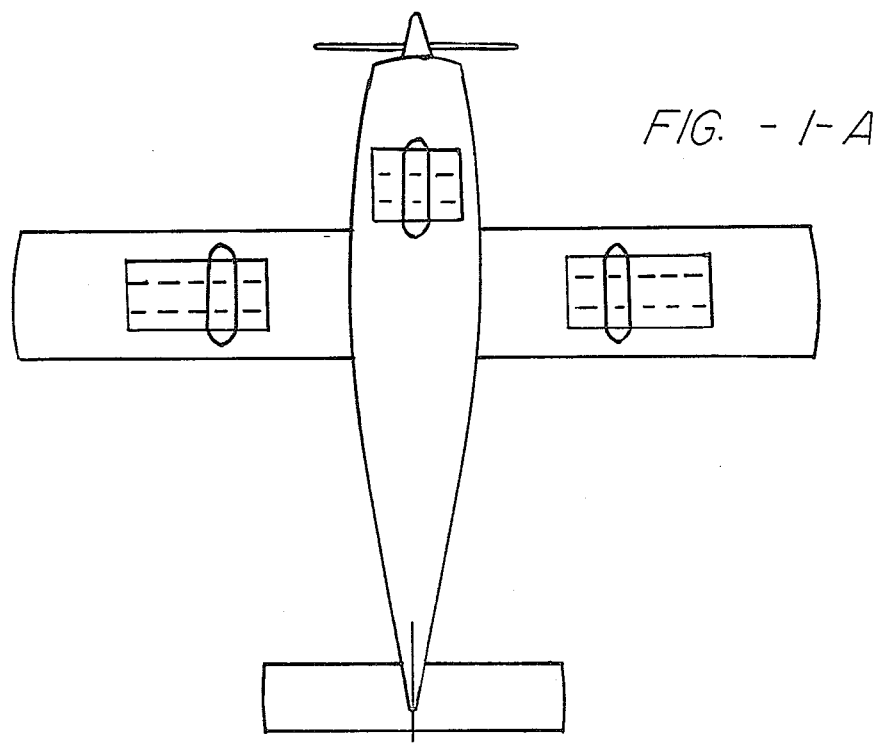
FIG.-1-A

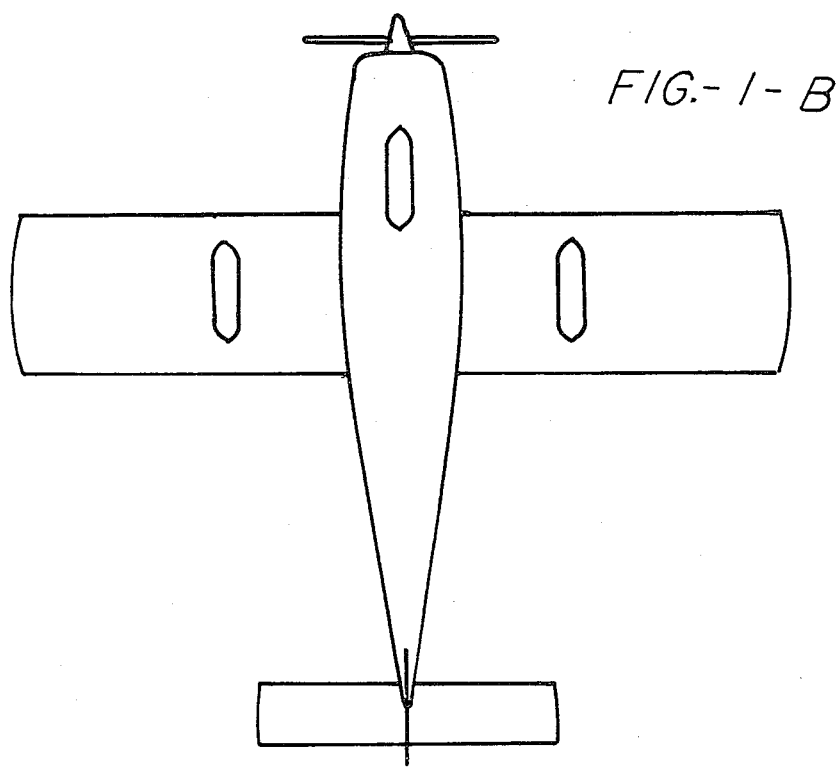
FIG.-1-B
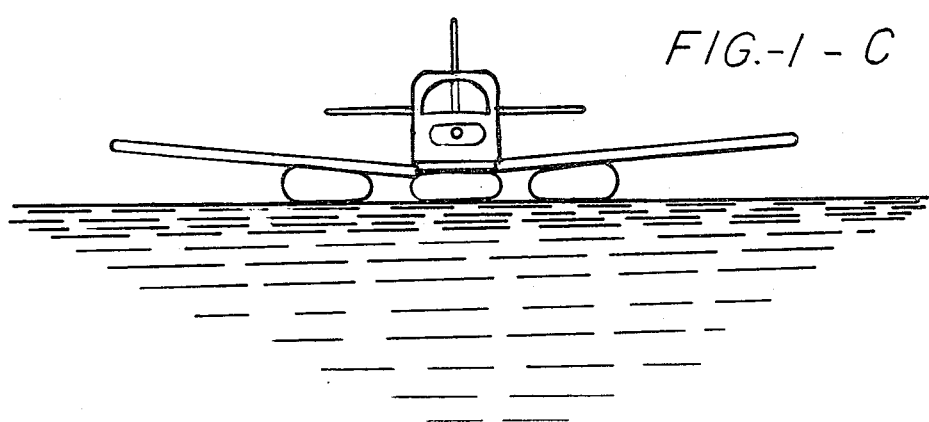
FIG.-1-C

SAFETY FLOTATION DEVICE FOR AIRCRAFT

A previous application was filed June 13, 1969, Ser. No. 833,103, now abandoned.

The flotation device hereinafter described in detail is for use on all aircraft; low wing and high wing, single and multi-engine aircraft as well as all type commercial aircraft. The nature of the flotation device is that of inflatable rectangular flat floats attached to various parts of small and medium aircraft and built into commercial type aircraft for the purpose of keeping all aircraft afloat until rescue, the object being to save lives and equipment and facilitate search and rescue due to the non submerged aircraft and radio equipment.

FIG. 1 is a front view of the aircraft with the flotation devices stored.

FIG. 1-A is a view of the lower surface of the aircraft with the flotation devices deployed.

FIG. 1-B is a view of the lower surface of the aircraft with the flotation devices stored.

FIG. 1-C in a front view of the aircraft with the flotation devices deployed on the surface of water.

Figure 2:
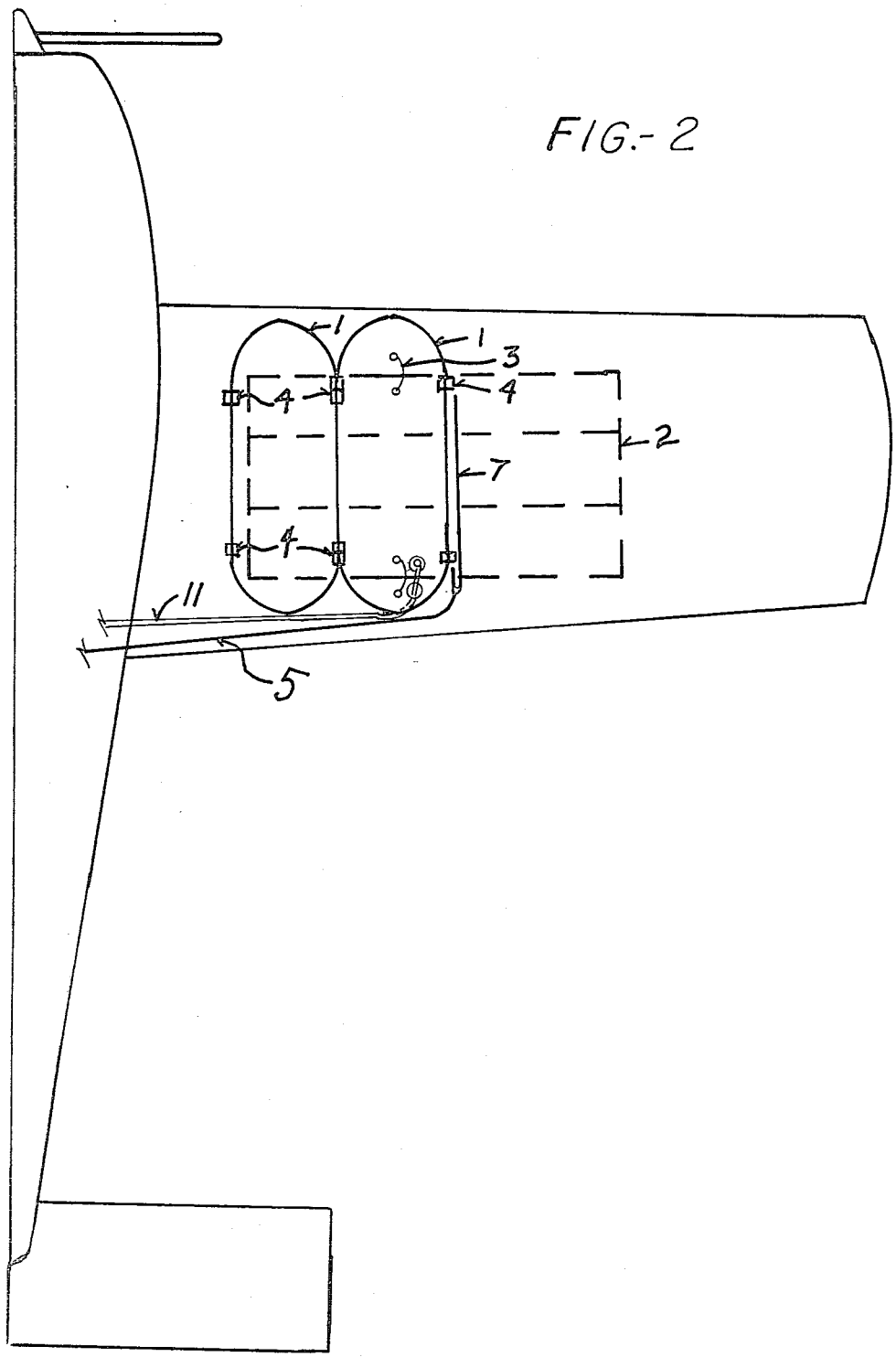
FIG. 2 is view of the compartment and door for the flotation device.
Figure 3:
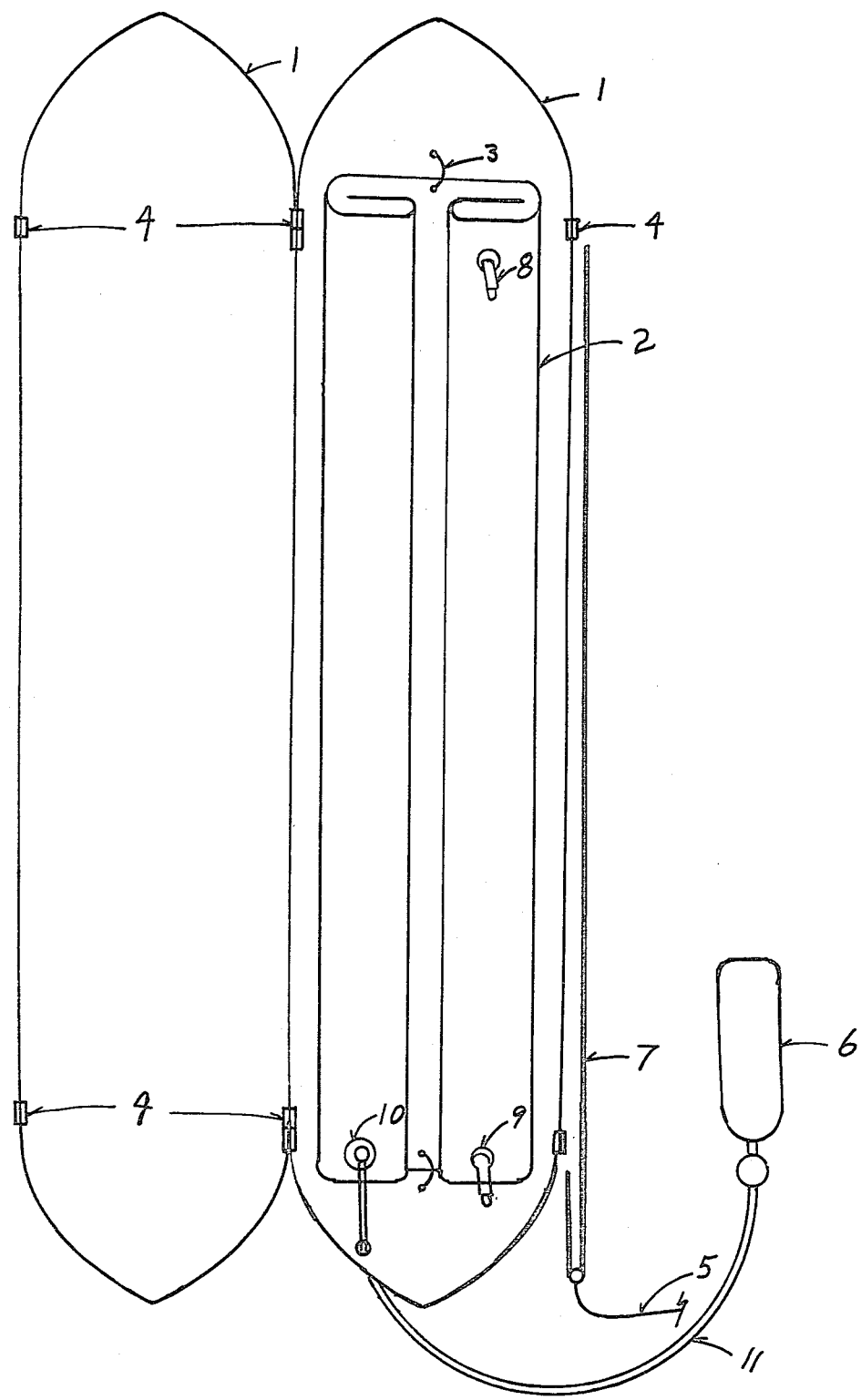
FIG. 3 is a detailed view of the compartment and deflated flotation device.

The flotation device is made of vulcanized rubberized fabric, folded or rolled and encased in a fiberglass enclosure FIG. 3 which when inflated from a container of gaseous liquid extends itself into a rectangular flat float and these floats will keep the aircraft afloat so that the aircraft radio can be used to contact other planes, ships or emergency rescue facilities. At the same time passengers and crew could remain in the aircraft where they would be safer than in the water where may dangers could be present and result in the loss of lives and property. After the aircraft has landed on the water, the floatation equipment is activated by pulling a knob or lever similar to a throttle cable 5 on FIGS. 2 & 3 which pulls out pins 7 which hold fiberglass door 1 on FIG. 3 and simultaneously activates the bottle containing the gaseous liquid 6 FIG. 3 through conduits 11 FIG. 3 and self-closing valve 10 FIG. 3 which inflates the rubberized fabric floats 2 FIG. 2 into a stable rectangular flat float when unfolded and extended underneath the wing panels, fuselage, and engine and/or engines in a matter of approximately six to ten seconds and is held in place by means of shock cord 3 FIG. 3 keeping the aircraft afloat. Two additional valves, one mouth inflatable type 8 FIG. 3 and one mechanical type 9 FIG. 3 for use with mechanical type pump used in combination with inflatable system. The doors 1 FIG. 3 are of rigid fiberglass material to which hinges 4 FIG. 3 are fastened. The enclosure FIG. 3 is fastened to the aircraft with machine screws or bolts on hinges 4 of suitable size to hold the device FIG. 3 in place.

When not in use, this device FIG. 3 with the door closed 1 with hinges 4 fastened to wing panel and pins 7 in place, encases folded rubberized flotation device FIG. 3 within itself. The door is quite rigid and streamlined so as not to disturb the aerodynamic characteristics of the aircraft, and the fact that the device is positioned on the underneath surface of the craft as referred above, the floats are arranged in fore and aft directions so as to offer the least possible resistance to air flow. The float unit FIG. 3 on wing panels and fiberglass door 1 are approximately one foot wide and three feet eight inches long, when assembled in place; the unit under the fuselage is approximately one foot wide and 3 feet 8 in. long. When viewed from the front FIG. 1 or the rear, the closed units appear to have a V shape or wedge shape look, streamlined in the direction of flight of the aircraft.

On larger type aircraft these devices are built into the bottom surface of the wings and bottom surface of the fuselage with minor adaptations.

On high wing aircraft, the units may be located underneath the fuselage, the wings, or both to stabilize the aircraft on the water.

On all aircraft, the lowermost surface of the rectangular flat floats when extended to their most extended position are on the same plane and the floats extend from the water to the lower surface of the wing structure FIG. 1. The float device is the means of buoying the wings of the aircraft and may also support the fuselage. The cross section of the float may vary in height, both transversely and longitudinally.

It is to be understood that other and further modifications can be made to the present invention without departure from the spirit thereof.

We claim:

1. The combination with an aircraft of a plurality of inflatable flotation devices attached to the underside of said aircraft for supporting said aircraft in a body of water; said aircraft having a fuselage and wings attached thereto with said wings extending transversely from said fuselage; the underside of said fuselage and said wings is spaced from a horizontal plane that is parallel to the surface of said body of water in such a manner that the height between said underside and said horizontal plane varies in both transverse direction and in the fore and aft direction of said wings; said plurality of flotation devices are stored in a normally deflated condition in compartments adjacent to the underside of said fuselage and said wings and when inflated the upper surface of said flotation devices is contiguous to the underside of said aircraft and the cross sectional shapes of each said flotational device varies in height in both said transverse and fore and aft directions such that the lower surfaces of said flotation devices are parallel to said horizontal plane, whereby the flotation devices support the entire aircraft in a horizontal attitude substantially out of the water; said compartments each having a streamlined door means thereon which is pivoted about a hinge means parallel to said fore and aft directions and which is held in a closed position by latch means; said latch means comprising pull pins which are actuated by a cable; said flotation devices are inflated from a valve controlled source of pressurized gas which is also actuated simultaneously by said cable when said pull pins are released; said flotation devices are secured to the underside of said aircraft by shock cords when said flotation devices are inflated and released from said compartments.

2. The device set forth in claim 1 in which the cross section of said flotation devices when inflated is trapezoidal type shaped with the lower surfaces being in a single horizontal plane while resting on the water.

3. The device set forth in claim 1 in which the cross section of said flotation devices varies along both the longitudinal and transverse axis of the aircraft.

4. The device set forth in claim 1 comprising said compartments are constructed as pods elliptical in shape, attached to the underside of the wings and fuselage, made of a rigid material and streamlined in shape, attached in a fore and aft direction, eliminating drag, with said door means being opened when activated from the cockpit by a lever after alighting on the water with flotation achieved in six to ten seconds.

5. The device set forth in claim 1 wherein said compartments are built into the underside of the fuselage and wings, leaving a smooth undersurface of the wing and fuselage, which eliminates any air friction and which when said float devices are extended through said door means built into the underside of the wings and fuselage, which opens when a lever is pulled activating the device, simultaneously allowing the gaseous liquid to inflate said flotation devices which support the entire plane in six to ten seconds after alighting on the water.

* * * * *